(12) United States Patent
Mathew et al.

(10) Patent No.: US 6,823,220 B2
(45) Date of Patent: Nov. 23, 2004

(54) DESIGN AND IMPLEMENTATION DEVICE FOR REAL-TIME CONTROLLERS

(75) Inventors: George Mathew, Waukesha, WI (US); Terry M. Topka, Scotia, NY (US); Lakshmi Gudapakkam, Waukesha, WI (US)

(73) Assignee: GE Medical Systems Global Technology Company, LLC, Waukesha, WI (US)

(*) Notice: Subject to any disclaimer, the term of this patent is extended or adjusted under 35 U.S.C. 154(b) by 428 days.

(21) Appl. No.: 09/682,721

(22) Filed: Oct. 10, 2001

(65) Prior Publication Data

US 2003/0069651 A1 Apr. 10, 2003

(51) Int. Cl.[7] .................................................. G05B 11/01
(52) U.S. Cl. ............................ 700/31; 700/23; 700/28; 700/30; 700/12
(58) Field of Search ............................ 700/23, 30, 31, 700/11, 28, 12, 17, 29, 86; 703/4; 710/19; 719/310, 318, 331; 717/127, 154, 162; 714/37–39, 51

(56) References Cited

U.S. PATENT DOCUMENTS

| | | | | |
|---|---|---|---|---|
| 5,386,464 A | * | 1/1995 | Pruitt ..................... | 379/201.03 |
| 5,675,756 A | * | 10/1997 | Benton et al. .............. | 345/853 |
| 5,920,718 A | * | 7/1999 | Uczekaj et al. ............. | 717/109 |
| 6,104,963 A | * | 8/2000 | Cebasek et al. ............. | 700/86 |
| 6,212,625 B1 | * | 4/2001 | Russell ..................... | 712/217 |
| 6,374,144 B1 | * | 4/2002 | Viviani et al. ............... | 700/12 |
| 6,477,439 B1 | * | 11/2002 | Bernaden et al. ........... | 700/103 |
| 6,546,297 B1 | * | 4/2003 | Gaston et al. ............... | 700/83 |

OTHER PUBLICATIONS http://wombat.doc.ic.ac.uk/foldoc/foldoc.cgi?query=library.*
http://wombat.doc.ic.ac.uk/foldoc/foldoc.cgi?query=annotate.*

* cited by examiner

Primary Examiner—Zarni Maung
Assistant Examiner—Aaron C Perez-Daple
(74) Attorney, Agent, or Firm—PeterJ. J. Vogel

(57) ABSTRACT

A state processor (10) for generating a state table (18) and a runtime code (19) for use in implementing of one or more pre-designed state models is provided. The state processor (10) includes a state model information provider (24), a state information separator (26), and a compiler (22). The state model information provider (24) extracts state model information in response to the one or more state models. The state information separator (26) generates a state code and the state table (18) in response to the one or more state models. The compiler (22) compiles the state code and generates the runtime code (19). A method for implementing the pre-designed state models is also provided including implementing the runtime code (19) in conjunction with the state table (18).

17 Claims, 3 Drawing Sheets

DESIGN AND IMPLEMENTATION DEVICE FOR REAL-TIME CONTROLLERS

BACKGROUND OF INVENTION

The present invention relates generally to medical imaging systems, and more particularly to an apparatus and method for implementing pre-designed state models for operation of real-time controllers within an X-ray imaging system.

X-ray imaging systems contain real-time controllers, which are built to control distributed hardware components within an X-ray imaging system. The hardware components are controlled in real-time. X-ray imaging systems are used for various applications having varying degrees of complexity. For example, an X-ray application such as a Digital Subtraction Angiography (DSA) is considered a more complex application and is performed by coordinating the operation of multiple real-time controllers.

Real-time controllers vary in scope depending upon the application, the X-ray imaging system, and the function to be performed. They are designed and implemented independently to perform the various functions such as X-ray generation, patient positioning, image acquisition, and image processing. Real-time controllers are required to provide coordination of runtime activities, and may be required to satisfy timing and performance constraints such as in Vascular and Radiography and Fluoroscopy X-ray applications.

Behavior of real-time controllers is traditionally specified as a state machine, which can be described by a state model. State machines describe how a real-time controller responds to stimuli received from the X-ray system in the form of events. The state machines are implemented using handwritten code. Writing of the code is a labor-intensive process that tends to be error-prone. Also, it is very difficult to ensure that the implementation of the state machines matches designed specifications.

Therefore, it would be desirable to provide an apparatus and method for implementing of state machines that is less labor-intensive than the current art and is also less error-prone. The apparatus and method may provide a more accurate implementation as to better match design specifications.

SUMMARY OF INVENTION

The foregoing and other advantages are provided by an apparatus and method for implementing pre-designed state models for operation of real-time controllers within an X-ray imaging system. A method for implementing a pre-designed state model is provided including extracting state information from the state model. The extracted state information is processed to generate a state code and a state table. The state code is compiled to generate a runtime code. The runtime code is used in combination with the state table to implement the state model.

A state processor for generating a state table and a runtime code for use in implementing of one or more pre-designed state models is also provided. The state processor includes a state model information provider, a state information separator, and a compiler. The state model information provider extracts state model information in response to the one or more state models. The state information separator generates a state code and the state table in response to the one or more state models. The compiler compiles the state code and generates the runtime code.

One of several advantages of the present invention is that it provides designers with versatility as to alter and automatically update code at any time.

Another advantage of the present invention is that use of a state model provides hierarchically organized states, in turn providing improved scalability and understandability of state models.

Furthermore, generic components are provided that implement event handling and state transitions. This allows state machines to be modified without altering basic functions performed by the controller.

Moreover, the present invention provides communication and cooperation between separate state machines. This also provides increased versatility.

The present invention through the use of state model diagrams and an automated process provides increased performance and is less error prone.

The present invention itself, together with attendant advantages, will be best understood by reference to the following detailed description, taken in conjunction with the accompanying figures.

BRIEF DESCRIPTION OF DRAWINGS

For a more complete understanding of this invention reference should now be had to the embodiments illustrated in greater detail in the accompanying figures and described below by way of examples of the invention wherein.

DETAILED DESCRIPTION

While the present invention is described with respect to a method and apparatus for implementing pre-designed state models for operation of real-time controllers within an X-ray imaging system, the present invention may be adapted for use in various systems including: radiotherapy systems, X-ray imaging systems, ultrasound systems, nuclear imaging systems, computer based systems, and other systems that use state models.

In the following description, various operating parameters and components are described for one constructed embodiment. These specific parameters and components are included as examples and are not meant to be limiting.

Figure 1:
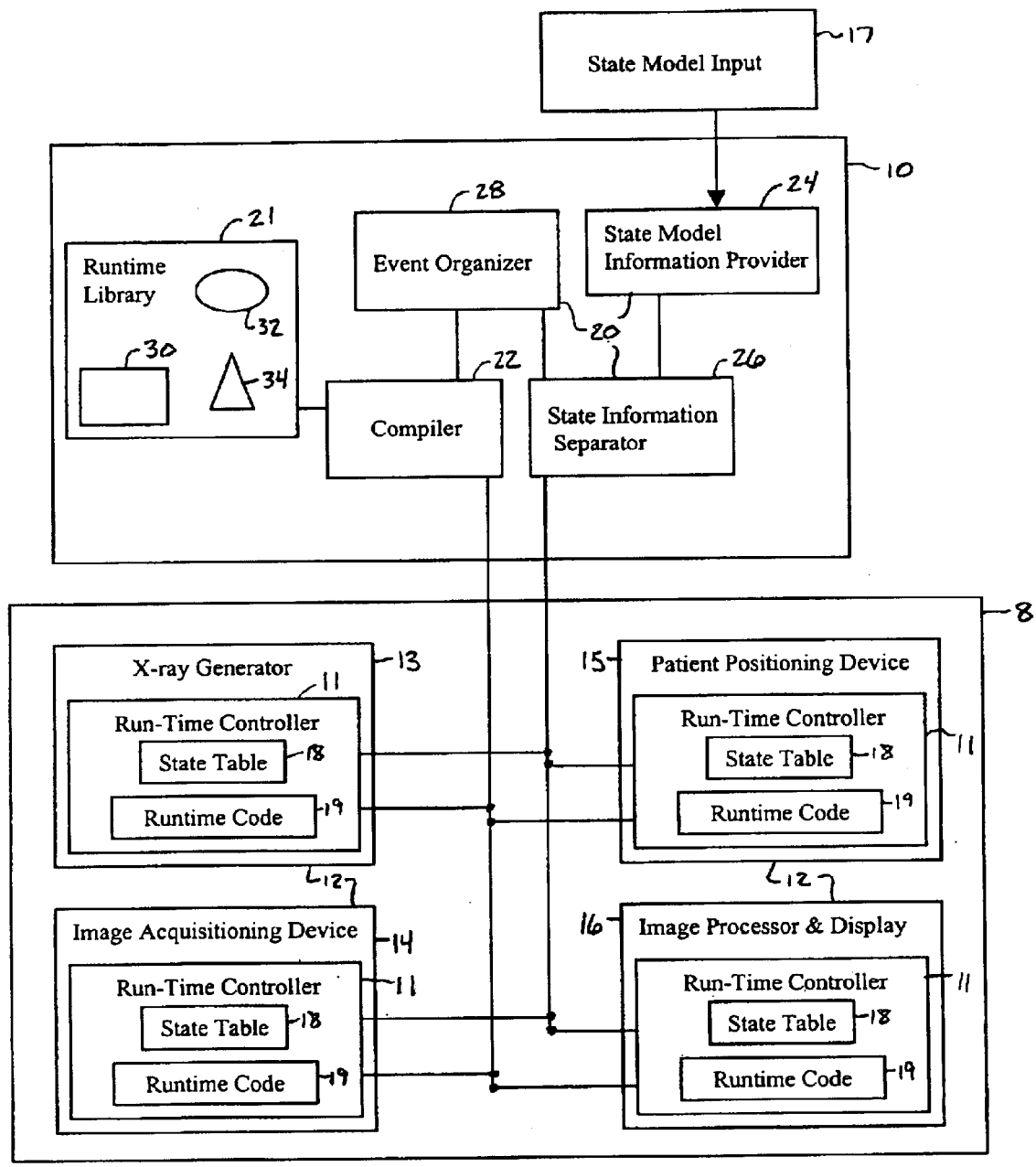
FIG. 1 is a block diagrammatic view of a X-ray system using a state processor in accordance with an embodiment of the present invention.

Referring now to FIG. 1, a block diagrammatic view of an X-ray system 8 using a state processor 10 in accordance with an embodiment of the present invention is shown. Real-time controllers 11 are a cooperating set of controllers that control distributed hardware components 12 in real-time. Examples of hardware components may be an X-ray generator 13, an image acquisitioning device 14, an image processor and display 15, and a patient positioning device 16.

The hardware components 12 are controlled by a series of events. The run-time controllers 11 implement the events in accordance to a pre-designed cooperating set of state models 17. The term "cooperating" is referring to the manner as to which the state models are interlaced and operate together to perform various functions, this will become more evident in the following description. The state models 17 are manually entered into a state model information provider 18 by an operator. The state models 17 include multiple state models each of which having multiple events. The device 10 generates state tables 18 and runtime codes 19 that are used by the run-time controllers 11 as to implement the multiple events through the use of three software-based tools 20, a runtime library 21, and a compiler 22. Although each hardware component 12 is shown as having a single run-time controller 11, each hardware component 12 may have more than one run-time controller. Also, each run-time controller 11 has its own state table 18 and runtime code 19 associated with actions for that corresponding hardware component 12. The three software-based tools 20 are the state model information provider 24, a state information separator 26, and an event organizer 28.

The state model information provider 24 is a software-based program that extracts state model information from the state models 17, such as event information and transitional information between each event. The state model information is converted to text format and transferred to the state information separator 26.

Figure 2:
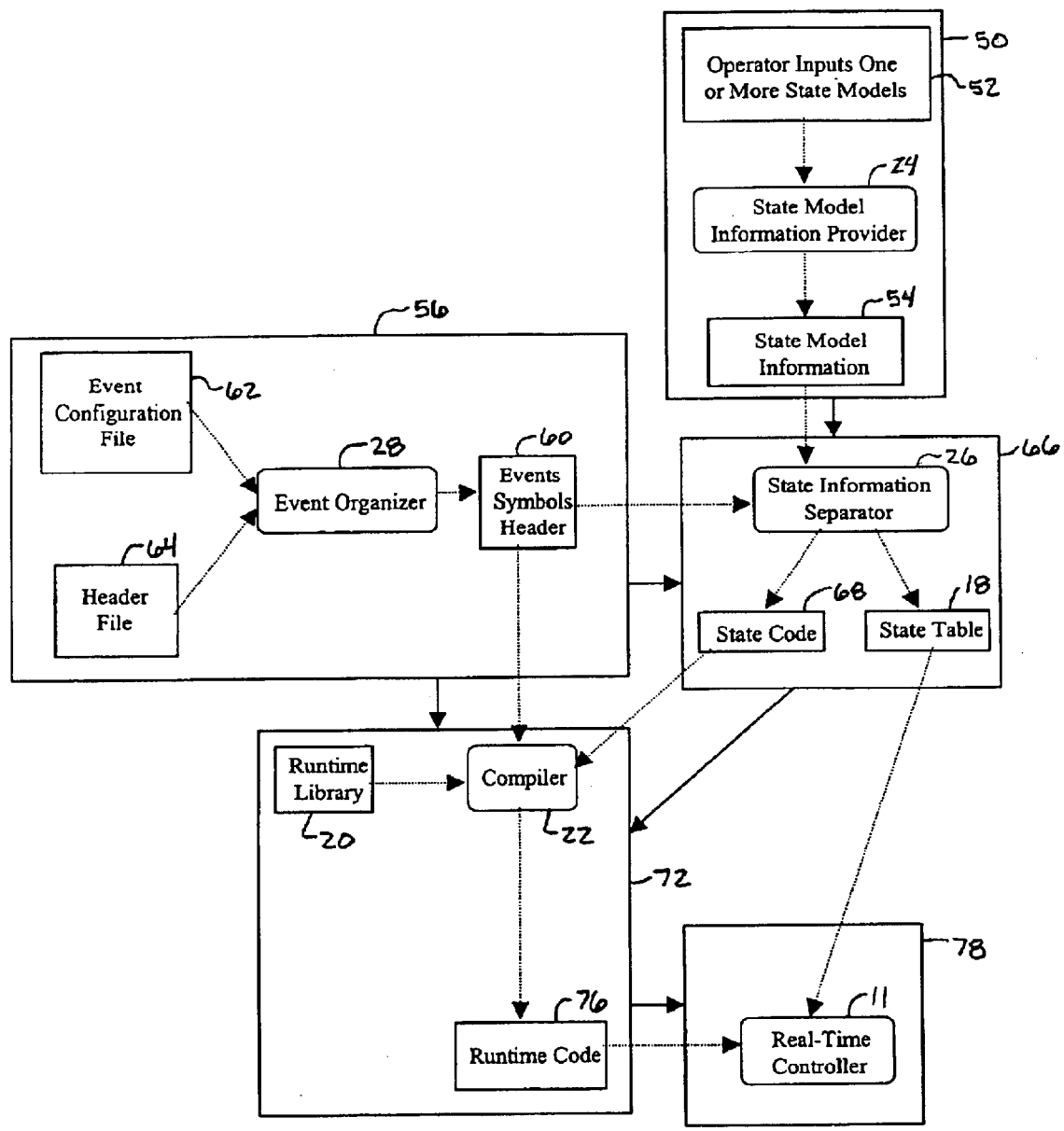
FIG. 2 is a process flow diagram illustrating a state processor process of the present invention, for implementing of a state model, in accordance with an embodiment of the present invention.

The event organizer 28 is a software-based program that generates an events symbols header from an events configuration file and a header file, and is best shown in FIG. 2. Although the event organizer 28 of the present invention is written in the Perl programming language other similar programming languages known in the art may be used. The events configuration file and the header file define events to be shared by the state models 17. The events symbols header contains global and shared event symbol definitions. Recognizing shared or common events between the state models 17 prevents duplication of stored events. The events symbol header contains a centralized list of all events for easy addition or renaming of events.

The state information separator 26 is also a software-based program that processes the events symbols header in combination with the state model information to generate state codes and the state tables 18, also best shown in FIG. 2.

The runtime library 21 contains a library of components including a dynamic event processor 30, a time and memory efficient interpreter 32, and a scripted dynamic event processor 34. The dynamic event processor 30 contains the definitions and information needed to implement events. The dynamic events processor 30 also provides the framework for handling of the events. The time and memory efficient interpreter 32 processes events and performs actions according to information contained in the state table. Although, the runtime library 21 is designed to meet timing and performance requirements of X-ray imaging applications, it may be designed to meet timing and performance requirements of other systems. The scripted dynamic event processor 34 may be used to annotate the state models using a script programming language known in the art, such as Tcl. The annotation of state models allows state behavior to be changed without having to rebuild the run-time code.

The compiler 22 compiles the state code using the events symbols header and the components contained within the runtime library 21 to produce a runtime code. The runtime code may be perceived as a state machine in that it is the code that is used to control the hardware components 12. The compiler 22 may be a C++ compiler or other compiler known in the art.

The real-time controller 11 may be microprocessor based controllers such as computers having central processing units, memory (RAM and/or ROM), and associated input and output buses. The controllers 11 implement the events in the set of state models as instructed by the runtime codes while referring to the corresponding state tables. The state tables are used to provide the state behavior expected from the controllers 11. Although, a single controller 11 is shown for each hardware component 12, a single main controller may be used in replacement of the controllers 11 as to control the hardware components 12.

Referring now to FIG. 2, a process flow diagram illustrating a state machine process of the present invention, for implementing of a state model by a single run-time controller 11, in accordance with an embodiment of the present invention is shown. In the following diagram the solid lined arrows represent the flow of transitional steps, the dashed lined arrows represent flow of information including generated files, code, and data.

In step 50, an operator inputs one or more state models 52, which may be visible, through the use of a drawing tool (not shown) into the state model information provider 24. State model drawing tools are known in the art. The state model information provider 24 extracts state information 54, converts the information 54 to text format, and transfers the information 54 in text format to the state information separator 26. In doing so, the state model information provider 24 determines what states and events exist in the state model and the different transitions between each state.

In step 56, as stated above the events symbols header 60 is generated from an events configuration file 62 and the header file 64, via the event organizer 28. The events symbols header 60 contains global and shared event symbol definitions used, in a forthcoming step, for compiling of the state code.

In step 66, the state information separator 26 using the state model information 54 and the events symbols header 60 generates the state code 68 and the state table 18. The state table 18 contains information to be used by a real-time controller 11 at run-time to perform state transitions and to identify the actions and conditions associated with the transitions. The state code 68 contains software code, such as C++, that is to be executed when conditions are evaluated and actions are performed.

In step 72, the compiler 22 then in response to the events symbols header and the state code and using event, time, and memory information from the runtime library generates a runtime code 76.

In step 78, controller 11 implements the events in the state models 52, as instructed in the runtime code 76, in conjunction with the information in the state table 18.

Figure 3:
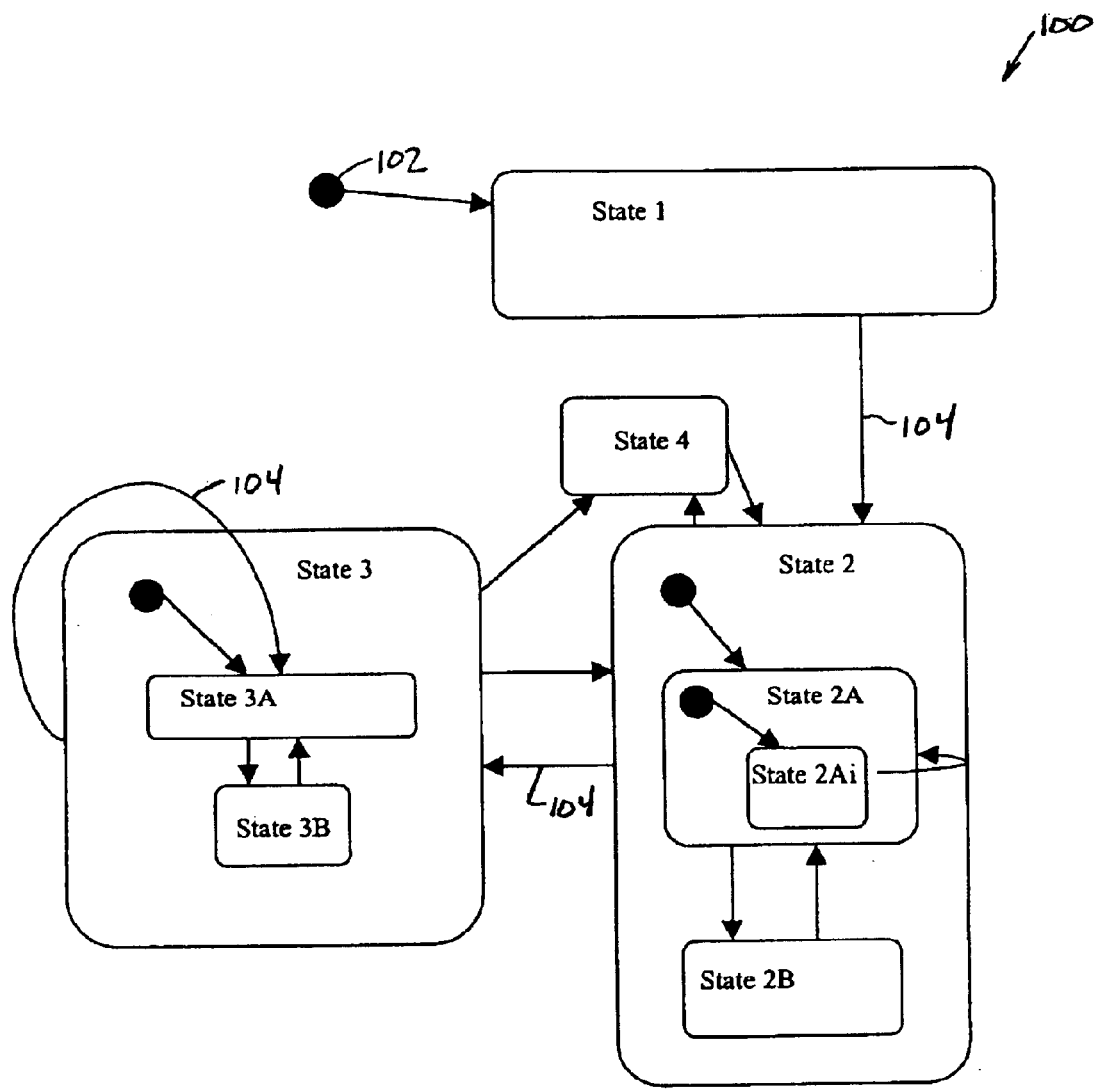
FIG. 3 is an example of an implementable state model diagram according to an embodiment of the present invention.

Referring now to FIG. 3, an example of an implementable state model diagram 100 according to an embodiment of the present invention is shown. The state model frequently contains nested states, which may be generated using a known language in the art, referred to as the Unified Modeling Language.

The state model diagram 100 begins at point 102 and entering State 1. State 1 is implemented followed by State 2 and State 3. Notice that each state may have imbedded states such as State 2A and other states as shown. States may refer to other states or consist of commands for performing specific actions, such as powering a component "ON" or "OFF", measuring a voltage level, or measuring a temperature. The specific actions are typically implemented in response to specific conditions.

Transitions, represented by arrows 104, exist between states and may have associated events and/or scripted events. This allows state actions to be directly specified on the state model using code fragments. Scripted events are often more complex than other events and have a corresponding script file as to perform multiple actions. Each state model may perform various functions as per application and hardware component 12, as stated above or other desired functions.

The present invention provides a general-purpose tool for implementing variously differing state models. The present invention also provides an easy method as for modifying an existing state machine and simplifying storage and implementation of events by recognizing and storing of common events between state models.

Furthermore, the present invention provides versatility in the design and implementation of state models by allowing easy and quick modification of event definitions.

The above-described apparatus, to one skilled in the art, is capable of being adapted for various purposes and is not limited to the following systems: radiotherapy systems, X-ray imaging systems, ultrasound systems, nuclear imaging systems, computer based systems, and other systems that use state models. The above-described invention may also be varied without deviating from the spirit and scope of the invention as contemplated by the following claims.

What is claimed is:

1. A method for implementing a pre-designed state model, said method comprising:
   extracting state information from the state model via at least one state processor;
   processing said extracted state information via said at least one state processor;
   generating a state code and a state table in response to said processed extracted state information via said at least one state processor;
   compiling said state code to generate a runtime code via said at least one state processor;
   transferring said runtime code and said state table to a designated controller that is separate from said at least one state processor; and
   implementing the state model by running said runtime code while utilizing information within said state table using designated controller.

2. A method as in claim 1 wherein extracting state information from the state model comprises determining what events exist in the state model.

3. A method as in claim 1 wherein extracting state information from the state model comprises determining what transitions exist between states within the state model.

4. A method as in claim 1 further comprising:
   generating an events symbols header in response to a header file; and
   generating said state code in response to said processed extracted state information and said events symbols header.

5. A method as in claim 4 wherein compiling said state code comprises compiling said state code in response to said events symbols header.

6. A method as in claim 1 further comprising:
   generating a events symbols header in response to an events configuration file; and
   generating said state code in response to said processed extracted state information and said events symbols header.

7. A method as in claim 1 further comprising annotating the state model using a script language to alter state behavior.

8. A method for implementing a pre-designed plurality of state models for a state machine having an event configuration file, said method comprising:
   extracting state information from the plurality of state models;
   generating an events symbols header having global and shared event symbol definitions from the event configuration file the event configuration file and said events symbol header defining events to be shared;
   processing said extracted state information in response to said events symbols header;
   generating a plurality of state codes and a plurality of state tables in response to said processed extracted state information;
   compiling said plurality of state codes using said events symbols header to generate a plurality of runtime codes; and
   implementing the state models by running said plurality of runtime codes while referring to said plurality of state tables.

9. A method as in claim 8 wherein implementing a pre-designed plurality of state models comprises implementing a cooperating set of run-time controllers.

10. A method as in claim 8 further comprising:
    generating said events symbols header in response to a header file; and
    generating said plurality of state codes in response to said processed extracted state information and said events symbols header.

11. A state processor for generating a state table and a runtime code for use in implementing one or more pre-designed state models, said device comprising:
    a state model information provider extracting state model information in response to the one or more state models having hierarchical organized states;
    a state information separator generating a state code and the state table in response to the one or more state models;
    an event organizer generating an event symbols header having global and shared event symbol definitions from an event configuration file in response to a header file, the event configuration file and said events symbol header defining events to be shared; and
    a compiler compiling said state code using said event symbols header to generate the runtime code.

12. A device as in claim 11 wherein said event organizer generates an event symbols header comprising a centralized list of all events for adding or renaming events.

13. A device as in claim 11 further comprising a runtime library comprising:
    at least one event processor; and
    an interpreter.

14. A device as in claim 13 wherein said runtime library comprises a generic state machine component for implementing of event handling.

15. A device as in claim 13 wherein said interpreter is a time and memory efficient interpreter for processing and handling events.

16. A device as in claim 13 wherein said at least one event processor comprises a scripted dynamic events processor for annotating the one or more state models to alter state behavior.

17. A device as in claim 11 wherein said state processor generates a plurality of state tables and a plurality of state codes in response to the one or more state models.

* * * * *

UNITED STATES PATENT AND TRADEMARK OFFICE
CERTIFICATE OF CORRECTION

| | | |
|---|---|---|
| PATENT NO. | : 6,823,220 B2 | Page 1 of 1 |
| APPLICATION NO. | : 09/682721 | |
| DATED | : November 23, 2004 | |
| INVENTOR(S) | : George Mathew, Terry M. Topka and Lakeshmi Gudapakkam | |

It is certified that error appears in the above-identified patent and that said Letters Patent is hereby corrected as shown below:

Column 5, line 43, should read as follows:

-- using said designated controller. --

Signed and Sealed this

Nineteenth Day of September, 2006

JON W. DUDAS
*Director of the United States Patent and Trademark Office*